Feb. 25, 1964     W. PENNINGTON     3,121,993
ROCKET PROPELLANT SUPPORT
Filed Dec. 5, 1960
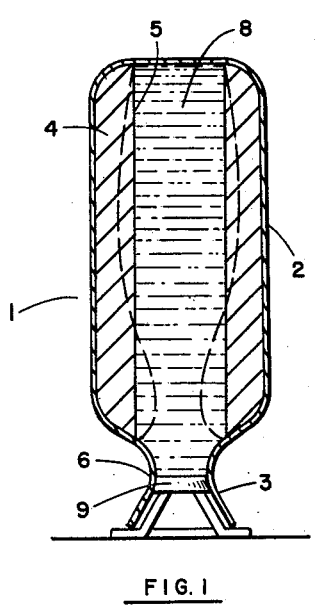
FIG. 1
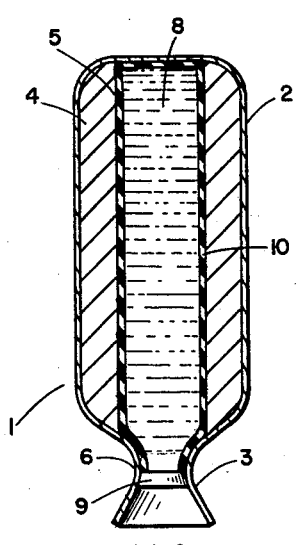
FIG. 2
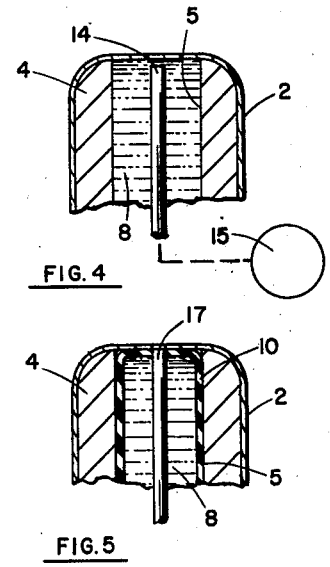
FIG. 4
FIG. 5
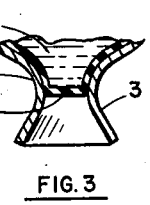
FIG. 3
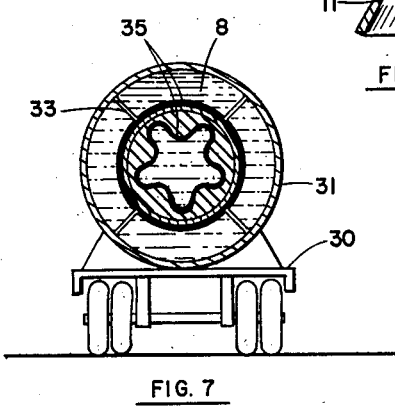
FIG. 7
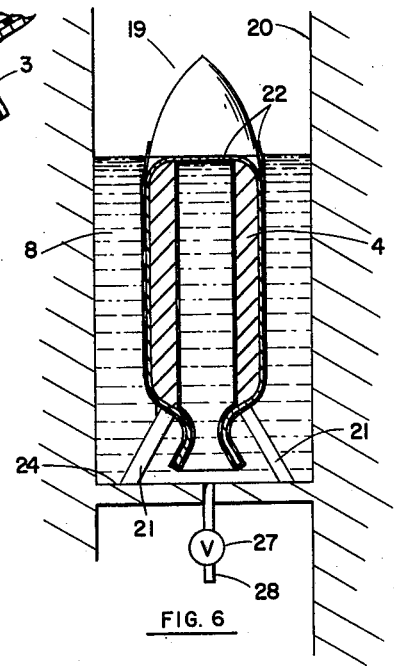
FIG. 6
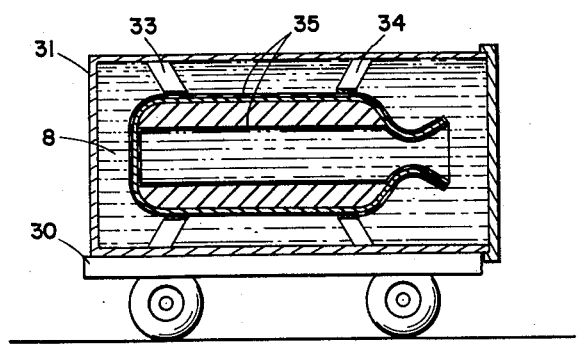
FIG. 8
INVENTOR.
WILLIAM PENNINGTON
BY *Richard F. Carr*
ATTORNEY

United States Patent Office 3,121,993
Patented Feb. 25, 1964

3,121,993
ROCKET PROPELLANT SUPPORT
William Pennington, 3834 Crestway Drive,
Los Angeles 43, Calif.
Filed Dec. 5, 1960, Ser. No. 73,738
14 Claims. (Cl. 60—35.6)

This invention pertains to an arrangement for supporting and protecting the propellant of solid rockets, including the prevention of distortion of the propellant.

One of the more serious problems presently encountered in solid rocketry is preventing the propellant from slowing, deforming or slumping under its own weight. In other words, the solid propellants have a tendency to deform in the area of the central cavity where the propellant is unsupported. This slow movement of the propellant increases with the age of the rocket motor, and results in a distortion of the internal gas flow passage as well as a change in the propellant burning surface area. After a period of time, this adversely affects the ballistic characteristics of the rocket.

At the present time, it is a common practice of the military to maintain rocket propelled missiles in firing readiness as an integral part of our national defense. These rockets may have to be kept in this condition for an indefinite period of time. Even a very slow rate of slump of the propellant, therefore, becomes critical in view of the long storage periods required. For many rockets the maximum storage life is entirely dependent upon the rate of slump of the propellant. In fact, some advantageous propellant formulations have not been utilized because of the relatively high rate of slump encountered. Thus, the prevention of rocket propellant slump can result in improved rockets as well as facilitating the maintenance of those of current design.

The problem is made even more acute by the present practice of building rockets of ever larger dimensions. This is because the rate of slump of the propellant is proportional to the linear size of the propellant configuration. As an illustration, if a cube of propellant is double the depth, width and height of another, it will exhibit the same relative distortion as the smaller cube in half the time.

Not only is propellant slump commonly found, but in some instances there is a slump of the rocket case as well. This occurs when the case is made of a plastic that is viscoelastic to a degree.

Still further difficulties are encountered in the transportation of solid rockets, which must be very carefully protected from shocks. In the past, elaborate precautions of this type have been required to assure that there would be no damage to the propellant parts. For example, when the cavity of the rocket is formed in a star shaped cross sectional configuration, the star points may break off unless the propellant is carefully isolated from vibrations and shocks as the rocket is moved.

It has been proposed in the past to prevent rocket propellant slump by the provision of a rigid mandrel inserted within the cavity to engage and support the inner surface of the propellant. This has not proven a satisfactory solution, however, due to several practical considerations. In the first place, the nozzle throat of the rocket motor is narrower than the interior of the cavity. Therefore, it is necessary in some manner to expand a mandrel after it is placed within the cavity in order that it may contact the surface of the propellant. Considerable precision is necessary in the mandrel construction so that it will not damage the surface of the propellant, yet will support all portions of it. As a result mandrels for this purpose have proven to be quite expensive, unreliable and their installation and removal is very time consuming. It is apparent that where missiles are stored in readiness for firing undue delays for removal of a mandrel prior to firing cannot be tolerated. Also, in the event a firing is called off, the reinstallation of the mandrel causes considerable down time of the entire missile system.

The present invention overcomes the difficulties outlined above by the provision of a liquid within the cavity of the rocket motor, which liquid has substantially the same density as the density of the propellant. When this is done, there is no tendency for the propellant to slump. In many instances the propellant surface is protected by a bladder or a suitable membrane provided between the liquid and the propellant. Distortion of the case also may be precluded by provision of the liquid on the exterior of the rocket. In addition, a substantially shockproof arrangement for transportation of the rocket is effected by supporting the rocket within a chamber filled with such a liquid.

Therefore, it is an object of this invention to provide an arrangement for preventing slump or distortion of a viscoelastic material.

Another object of this invention is to preclude distortion of rocket propellants and rocket cases.

An additional object of this invention is to increase the storage life of rocket propelled missiles.

A further object of this invention is to provide a means for preventing slump of rocket propellants which either is installed or removed in only a few moments of time.

Yet another object of this invention is to provide an arrangement reducing overall expenditures for rockets by minimizing the cost of rocket maintenance.

A still further object of this invention is to substantially eliminate shocks and vibrations on rocket propellants or other delicate objects during transportation thereof.

These and other objects will become apparent from the following detailed description taken in connection with the accompanying drawing in which:

FIG. 1 is a cross sectional view of a rocket motor utilizing the arrangement of this invention, FIG. 2 is a cross sectional view, similar to FIG. 1, of a slightly modified arrangement, including a flexible membrane, FIG. 3 is a fragmentary sectional view illustrating the retention of the fluid within the rocket cavity by means of the membrane, FIG. 4 is a fragmentary sectional view of the invention showing the addition of a vent pipe to facilitate fluid drainage, FIG. 5 is a fragmentary view showing the vent pipe as utilized where a membrane is included in the cavity, FIG. 6 is a sectional view of a missile stored in a silo showing the prevention of case slump as well as propellant slump, FIG. 7 is a cross sectional view of the arrangement of this invention used for the shock-free transportation of a rocket, and FIG. 8 is a longitudinal sectional view of the arrangement of FIG. 7.

With reference to the drawing there may be seen in

FIG. 1 a typical solid rocket motor 1 having a case 2 terminating at the lower end in convergent-divergent nozzle 3. Within the case 2 is the rocket propellant 4 provided with an axially extending opening 5 therethrough, carefully dimensioned to provide a proper burning chamber. The cross sectional dimension on the cavity 5 is larger than the throat 6 of the nozzle 3. The rocket motor, when installed in a missile and stored in firing readiness, will be retained substantially in a vertical position as illustrated.

The slump or distortion occurring in time for a typical rocket propellant formulation is indicated in phantom in FIG. 1. It may be seen that the upper portion of the cavity may become enlarged while the propellant shifts downwardly to reduce the width of the cavity at the area above the nozzle. Only a relatively minor amount of such distortion can be tolerated before the performance of the rocket is reduced materially.

According to the provisions of this invention, a liquid 8 is introduced into the cavity 5 when the rocket is positioned for storage. A suitable closure plug 9 of any appropriate configuration is positioned at the lower end of the case, sealing off the cavity area to prevent the liquid from draining out. The liquid 8 is selected so that it has a density substantially equal to the density of the propellant. When this is accomplished the boundary between the liquid and the propellant is in hydrostatic equilibrium, and all tendency for the propellant to slump is removed. This is regardless of the fact that the propellant may be viscoelastic to a large degree, because without a differential in density there will be no resultant forces from the weight of the propellant to cause the distorting effect.

By this simple provision, therefore, and with very little expense, it is possible to completely remove the formidable difficulty of propellant slump. Liquid naturally conforms to any irregularities and curvatures within the cavity, engaging all portions of the inner surface area of propellant. Thus, regardless of the fact that the throat 6 of the nozzle is of smaller cross sectional dimensions than the interior of the cavity, and even though the cavity may have a star shaped cross section or other varying surface configuration, no difficulty is encountered in preventing slump of the propellant. Filling the cavity with the liquid or removing it is accomplished in only a few seconds. In order to fire the rocket motor 1 it is only necessary to remove plug 9 which will allow the liquid 8 to run rapidly from the interior of the rocket which may be fired at once thereafter.

In many instances it is preferred to provide a thin membrane 10 to avoid direct contact between the liquid and the propellant surfaces. This is to protect the propellant so that the liquid can enter into no reaction with it. This membrane conveniently and economically may be formed of flexible plastic material impervious to the liquid 8, and can be shaped to complementarily fit the interior of the cavity. Alternatively, an elastic material may be utilized which will stretch to engage the propellant surfaces when the liquid is introduced into the bladder. It is possible also to construct the membrane as an oversize bladder to assure that the propellant surfaces will be contacted throughout the interior of the rocket.

When the bladder or the membrane 10 is used a closure plug such as element 9 may be employed to retain the liquid within the interior. It is possible also to seal the bottom of the membrane as shown in FIG. 3 so that the bottom section 11 of the membrane acts as its own retaining means for the liquid. In this event, when the rocket is to be fired the liquid is drained from the membrane simply by puncturing the bottom end of the membrane at the location of the nozzle.

By proper design the membrane can be caused to collapse over the nozzle opening as the liquid is drained out. This permits the rocket motor to be fired prior to removal of the bladder from the interior, allowing the pressure of the propellant gases to force the membrane outwardly through the nozzle. An additional saving in time is accomplished in this manner. In the event that the firing should be cancelled the bladder again may be filled with liquid to engage the propellant surface and sealed at the bottom end as before.

In order to hasten the draining of the liquid from the rocket interior, and when no interior membrane is provided, a tube 14 such as seen in FIG. 4 may be inserted into the rocket cavity extending upwardly to a location adjacent the upper end wall of the rocket motor. This tube may be utilized to permit atmospheric air to enter the space above the liquid as the liquid is drained from the rocket interior, so that there will be no tendency to cavitate in this area and a maximum draining rate can be achieved. Alternatively, a source of pressurized air or other gas 15 may be connected to the tube 14 so that the fluid may be forced from the rocket interior and blown out in only a few seconds.

Where a membrane is employed in the interior of the cavity a similar tube 17 may be utilized, bringing the air or other gas at atmospheric or higher pressure to the upper end portion of the rocket motor between the bladder and the inner rocket motor surfaces.

A number of different chemicals can be used within the rocket motor to provide a fluid having substantially the density of the propellant. In general the densities of solid propellants range from about 1.6 grams per milliliter to approximately 2.1 grams per milliliter. The density of the liquid may be varied to suit the particular propellant density encountered. The aqueous solutions of several different chemicals can be adjusted to fall within this range, and of course appropriate mixtures can be provided in giving precise results. Aqueous zinc chloride can be given a density of 1.96 grams per milliliter and is suitable for this purpose. Also, aqueous ferric chloride can be adjusted to 1.97 grams per milliliter, and aqueous thallium formate can be given a density of 3.5 grams per milliliter.

When high portions of dissolved materials are included in such solutions they remain liquid well below zero degrees centigrade. Other materials are available for even lower temperatures. An example is carbon tetrachloride which has a density of 1.6 grams per milliliter and freezes at $-23°$ C.

A perfect matching of the densities of the propellant and the liquid over a wide range in temperature cannot actually be accomplished. Thermal expansion rates will differ and compressibilities will not be precisely the same. However, the error in this regard is minor and easily can be limited to a difference in densities of less than one percent of the propellant density. This means that even with as much as a one percent difference in densities at some particular condition, the slump realized would only be one percent as great as that which would occur in the absence of the liquid.

When the rocket case as well as the propellant has a tendency to slump the rocket storing arrangement shown in FIG. 6 may be resorted to. Here a rocket propelled missile 19 is shown retained within a silo 20, supported in its nozzle down position by means of a suitable stationary base 21. Membrane 22 blankets the interior of the rocket motor and also extends along the exterior surface of the case. Fluid then is introduced within the silo 20 above floor 24, rising to the level of the top of the cavity in the interior of the motor. This provides substantial hydrostatic equilibrium on all critical surfaces of the rocket. Normally, the rate of slump of the case will be much less than for the propellant so that it is not necessary to match the density of the liquid as closely to the density of the case material as for the propellant. When the missile of FIG. 6 is to be fired, a valve 27 is opened allowing the liquid to drain through outlet 28 in the floor whereupon the rocket is ready to be ignited. Again, if desired, gas pressure may be employed in forcing the liquid out of the area around the rocket.

The provisions of this invention have an additional function in permitting shock and vibration proof transportation of the rocket by surface means. To this end a trailer 30 or other vehicle may be provided with a tank 31 in which the rocket is suspended by straps 33 and 34. A membrane 35 surrounds the exterior and inner surface of the rocket in the usual instance to protect these surfaces. A liquid is introduced within the container 31, filling this unit. This liquid again is substantially the same in density as the density of the propellant. Therefore, with the rocket and the surrounding liquid of virtually the same density, there will be no tendency for relative movement of the rocket as the vehicle is subject to bumps. Thus the entire fluid container and its contents will move together and sharp jolts will be eliminated. As a result the propellant will not be subjected to shock and vibration forces of a type which can cause damage to it.

It can be seen from the foregoing, therefore, that I have provided an improved yet low cost arrangement for storing or transporting solid propellant rockets whereby slump of the propellant or the case becomes a thing of the past, and storage life is greatly lengthened. Furthermore, it is possible by the provisions of this invention to transport the rocket without any hazard to its relatively delicate structure.

While the invention has been described as applying to rockets, it is apparent that it will function in the same manner wherever slump or creep may be encountered. By placing a liquid against a critical surface of substantially the same density as the material subject to deformation, the resulting stability will occur regardless what substances are involved. Furthermore, the use of the container with fluid of appropriate density is used to advantage in the transportation of many fragile or delicate items.

The foregoing detailed description is to be clearly understood as given by way of illustration and example only, the spirit and scope of this invention being limited solely by the appended claims.

I claim:

1. In combination with an object having an unsupported surface subject to distortion under its own weight over a period of time, an arrangement for precluding such distortion comprising a liquid engaging said surface, said liquid having substantially the same density as the density of said object.

2. In combination with a rocket having a case and a solid propellant within said case, said propellant being subject to distortion under its own weight over a period of time and defining gas exhaust aperture means within said case, an arrangement for preventing gravitational distortion of said propellant comprising a liquid within and substantially filling said aperture means, said liquid having substantially the same density as the density of said propellant.

3. A device as recited in claim 2 including in addition a flexible lamina interposed between the surface of said propellant at said aperture means and said liquid, said lamina being impervious to said fluid and substantially complementarily engaging said propellant at said aperture means for thereby precluding contact between said liquid and said propellant.

4. In a rocket having a case having an opening, a solid propellant in said case, said propellant being subject to distortion under its own weight over a period of time and having a cavity within said propellant communicating with said opening, an arrangement for preventing distortion of said propellant under its own weight at said cavity comprising a liquid substantially filling said cavity, said liquid having substantially the same density as the density of said propellant, and removable retaining means in said opening for holding said liquid in said cavity.

5. A device as recited in claim 4 in which said retaining means comprises a relatively thin flexible frangible membrane.

6. A device as recited in claim 4 including in addition a conduit means extending into said cavity from the exterior of said case for conducting a gas into said cavity for filling voids therein when said retaining means is removed and said liquid is conducted out of said cavity.

7. A device as recited in claim 4 including in addition conduit means extending into said cavity from the exterior of said case, and means for conducting a pressurized gas through said conduit means for thereby forcing said liquid through said opening when said retaining means is removed.

8. In combination with a rocket motor having a housing defining a propellant chamber and a nozzle, and a solid propellant within said propellant chamber, said solid propellant having an aperture extending axially therein from said nozzle, said propellant and said housing being of materials capable of distortion under their own weight over a period of time, a device for precluding such distortion of said case and said propellant comprising a chamber receiving said rocket motor, and a liquid within said chamber, said liquid filling said aperture and surrounding the exterior of said housing and having a density substantially equal to the density of said propellant.

9. A device as recited in claim 8 including in addition a relatively thin flexible membrane complementarily engaging said housing and said propellant and being interposed between said propellant and housing and said liquid, said membrane being impervious to said liquid for thereby precluding contact between said liquid and said housing and said propellant.

10. The method of preventing gravitational creep of a viscoelastic material having an unsupported surface comprising disposing a liquid in contact with said surface, said liquid having a density substantially equal to the density of said material, and maintaining said liquid in such contact during the time said material is subject to said gravitational creep.

11. The method of preventing distortion under its own weight of the propellant of a stored rocket having a solid propellant subject to distortion under its own weight over a period of time, said propellant defining a cavity within said rocket comprising filling the cavity of such a rocket with a liquid having substantially the same density as the density of said propellant, and maintaining said liquid within said cavity while said rocket is being stored.

12. In combination with a rocket motor having a solid propellant therein, said propellant defining a cavity, a device for shock-free transportation of said rocket motor comprising a container capable of being transported, flexible means supporting said rocket motor within said container spaced from the wall thereof, and a liquid substantially filling said container and said cavity, said liquid having substantially the same density as the density of the propellant of said rocket motor.

13. In combination with an object having an unsupported surface subject to distortion under its own weight over a period of time,
    an arrangement for precluding such distortion comprising
        a relatively thin flexible membrane one side of which engages said surface,
        and a liquid engaging the opposite surface of said membrane,
            said liquid having substantially the same density as the density of said object,
            said membrane being impervious to said liquid.

14. The method of preventing gravitational creep of a viscoelastic material having an unsupported surface comprising the steps of
    disposing one side of a relatively thin flexible membrane in contact with said surface,
    disposing a liquid in contact with the opposite side of said membrane, said liquid having a density substantially equal to the density of said material, said membrane being impervious to said liquid for protecting said material from said liquid, and maintaining said liquid and said membrane in such contact during the time said material is subject to said gravitational creep.

References Cited in the file of this patent

UNITED STATES PATENTS

| | | |
|---|---|---|
| 1,367,231 | Boyer | Feb. 1, 1921 |
| 2,335,779 | Mazzei | Nov. 30, 1943 |
| 2,664,373 | Reilly | Dec. 29, 1953 |
| 2,764,950 | Finnell | Oct. 2, 1956 |
| 2,791,883 | Moore et al. | May 14, 1957 |
| 2,832,581 | Youngs | Apr. 29, 1958 |
| 2,917,894 | Fox | Dec. 22, 1959 |
| 2,935,189 | Barton | May 3, 1960 |
| 2,986,001 | Green | May 30, 1961 |
| 3,032,979 | Corbett | May 8, 1962 |

FOREIGN PATENTS

| | | |
|---|---|---|
| 1,221,360 | France | Jan. 11, 1960 |